US008880109B2

(12) United States Patent
Nakamura et al.

(10) Patent No.: US 8,880,109 B2
(45) Date of Patent: Nov. 4, 2014

(54) RADIO COMMUNICATION SYSTEM, HIGH-POWER BASE STATION, LOW-POWER BASE STATION, AND COMMUNICATION CONTROL METHOD

(75) Inventors: Kazutaka Nakamura, Yokohama (JP); Kenta Okino, Yokohama (JP); Taku Nakayama, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 70 days.

(21) Appl. No.: 13/641,396

(22) PCT Filed: Apr. 15, 2011

(86) PCT No.: PCT/JP2011/059437
§ 371 (c)(1),
(2), (4) Date: Nov. 7, 2012

(87) PCT Pub. No.: WO2011/129448
PCT Pub. Date: Oct. 20, 2011

(65) Prior Publication Data
US 2013/0210445 A1    Aug. 15, 2013

(30) Foreign Application Priority Data
Apr. 16, 2010 (JP) .................. 2010-095546

(51) Int. Cl.
H04W 88/02 (2009.01)
H04W 16/32 (2009.01)
H04W 16/18 (2009.01)
H04W 52/24 (2009.01)
H04W 84/04 (2009.01)

(52) U.S. Cl.
CPC .............. *H04W 16/18* (2013.01); *H04W 16/32* (2013.01); *Y02B 60/50* (2013.01); *H04W 84/045* (2013.01); *H04W 52/244* (2013.01)
USPC ........................................................ 455/501

(58) Field of Classification Search
USPC .................................. 455/501, 418; 370/329
See application file for complete search history.

(56) References Cited

U.S. PATENT DOCUMENTS

2005/0152312 A1   7/2005   Marinier et al.
2005/0152320 A1   7/2005   Marinier et al.
(Continued)

FOREIGN PATENT DOCUMENTS

| JP | 2007-518361 A | 7/2007 |
| JP | 2013-524737 A | 6/2013 |
| WO | 2011/130438 A1 | 10/2011 |

OTHER PUBLICATIONS

An Office Action "Notification of Reasons for Rejection" issued by the Japanese Patent Office on Jul. 9, 2013, which corresponds to Japanese Patent Application No. 2012-510722 and is related to U.S. Appl. No. 13/641,396; with the Statement of Relevance of Non-English References.

(Continued)

*Primary Examiner* — Diane Mizrahi
(74) *Attorney, Agent, or Firm* — Studebaker & Brackett PC (57) ABSTRACT

A radio communication system 1 includes a pico-cell base station PeNB installed in a communication area of a macro-cell base station MeNB, having lower transmission power than the macro-cell base station MeNB, and expanded in its coverage. The macro-cell base station MeNB determines a degree of expanding the coverage of the pico-cell base station PeNB, according to an amount of usable PDSCH resources of the macro-cell base station MeNB.

11 Claims, 8 Drawing Sheets

(56) References Cited

U.S. PATENT DOCUMENTS

| | | | |
|---|---|---|---|
| 2005/0153690 | A1 | 7/2005 | Marinier et al. |
| 2006/0276134 | A1 | 12/2006 | Marinier et al. |
| 2008/0037439 | A1 | 2/2008 | Cave et al. |
| 2011/0249642 | A1 | 10/2011 | Song et al. |
| 2012/0094702 | A1* | 4/2012 | Furueda et al. .............. 455/501 |
| 2013/0028228 | A1* | 1/2013 | Nakayama et al. .......... 370/329 |
| 2013/0044722 | A1* | 2/2013 | Kang et al. .................... 370/329 |
| 2013/0163529 | A1* | 6/2013 | Chen et al. .................... 370/329 |
| 2013/0288695 | A1* | 10/2013 | Okino, Kenta ............... 455/450 |

OTHER PUBLICATIONS

Kyocera; "Range Expansion Performance and Interference Management for Control Channels in Outdoor Hotzone Scenario"; 3GPP TSG WG1 Meeting #60bis; Beijing, China; Apr. 12-16, 2010.

QUALCOMM Incorporated; "Importance of Serving Cell Selection in Heterogeneous Networks"; 3GPP TSG-RAN WG1 #60; San Francisco, CA; Feb. 22-26, 2010.

NTT DOCOMO; Performance Evaluations of Heterogeneous Networks; 3GPP TSG RAN WG1 Meeting #60; San Francisco, CA; Feb. 22-26, 2010.

International Search Report; PCT/JP2011/059437; May 17, 2011.

An Office Action; "Notice of Reasons fir Rejection," issued by the Japanese Patent Office on Oct. 29, 2013, which corresponds to Japanese Patent Application No. 2013-186507 and is related to U.S. Appl. No. 13/641,396; with English statement of relevance.

QUALCOMM Incorporated; "Downlink Interference Coordination Between eNodeB and Home eNodeB"; 3GPP TSG-RAN WG1 #60; San Francisco, CA; Feb. 22-26, 2010.

An Office Action; "Notification of Reasons for Rejection," issued by the Japanese Patent Office on Oct. 8, 2013, which corresponds to Japanese Patent Application No. 2012-510722 and is related to U.S. Appl. No. 13/641,396; with the Statement of Relevance of Non-English References.

An Office Action issued by the Korean Patent Office on Feb. 17, 2014, which corresponds to Korean Patent Application No. 10-2012-7027223 and is related to U.S. Appl. No. 13/641,396; with English language concise explanation.

The evidential screenshot or R1-102363's disclosed dated Apr. 6, 2010.

* cited by examiner

RADIO COMMUNICATION SYSTEM, HIGH-POWER BASE STATION, LOW-POWER BASE STATION, AND COMMUNICATION CONTROL METHOD

TECHNICAL FIELD

The present invention relates to a radio communication system, a high-power base station, a low-power base station, and a communication control method, to which a heterogeneous network is applied.

BACKGROUND ART

LTE (Long Term Evolution) and LTE Advanced which is an advanced type of LTE are next-generation systems providing communication which is faster and supports a larger capacity than the third-generation and the third-and-a-half generation cellular radio communication systems currently in operation. LTE and LTE Advanced are standardized by a standardization organization called 3GPP ($3^{rd}$ Generation Partnership Project).

In a downlink in the LTE systems (including LTE Advanced), a radio base station sends user data to a radio terminal by using a data transmission channel called PDSCH (Physical Downlink Shared Channel). Note that the downlink refers to communication in a direction from the radio base station to the radio terminal, whereas an uplink refers to communication from the radio terminal to the radio base station.

In LTE Advanced, provision of a heterogeneous network is under consideration. In a heterogeneous network, low-power base stations (so-called pico-cell base stations, femto-cell base stations, or relay nodes) are installed in a communication area of a high-power base station (a so-called macro-cell base station). A heterogeneous network is capable of distributing the load of the high-power base station to the low-power base stations.

However, since a radio terminal is generally connected to a radio base station which sends radio signals with the highest received power among multiple radio base stations, in the heterogeneous network the radio terminal may have a low chance of being connected to a low-power base station with low transmission power.

In consideration of such circumstances, there is proposed a method for expanding the coverage (communication area) of the low-power base station by performing control such that the radio terminal is connected to the low-power base station even when the received power from the low-power base station is not the highest (see, for example, Non-patent Document 1).

PRIOR ART DOCUMENT

Non-Patent Document

NON-PATENT DOCUMENT 1: 3GPP R1-101506 "Importance of Serving Cell Selection in Heterogeneous Networks" February, 2010.

SUMMARY OF THE INVENTION

When radio resources used as data transmission channels by neighboring radio base stations overlap each other, the data transmission channel of one of the radio base stations receives interference from the data transmission channel of the other base station, and therefore user data cannot be received normally from the one radio base station via its data transmission channel.

This problem is even more severe in the method of expanding the coverage of the low-power base station in the heterogeneous network since the data transmission channel of the low-power base station is highly likely to receive strong interference from the data transmission channel of the high-power base station.

Accordingly, the present invention has an objective of providing a radio communication system, a high-power base station, a low-power base station, and a communication control method capable of suppressing interference between base stations even when the coverage of the low-power base station is expanded.

The present invention has the following features in order to solve the aforementioned problem. First of all, a feature of the radio communication system is summarized as follows. A radio communication system comprises: a high-power base station (macro-cell base station MeNB); and a low-power base station (e.g. pico-cell base station PeNB) installed in a communication area of the high-power base station, having lower transmission power than the high-power base station, and expanded in its coverage, wherein the radio communication system further comprising a determination unit (bias value determination unit 123 or bias value determination unit 223) configured to determine a degree of expanding the coverage of the low-power base station, according to an amount of usable resources which are radio resources usable as a particular downlink channel (e.g. PDSCH) by the high-power base station. Here, the particular downlink channel is a downlink data transmission channel (PDSCH in LTE) for example. However, the particular downlink channel may be a downlink control information transmission channel (PDCCH in LTE) and so on, not apply only to downlink data transmission channel. The low-power base station is a pico-cell base station or a femto-cell base station for example. However, the low-power base station may be a relay node and so on, not apply only to the pico-cell base station or the femto-cell base station.

With the radio communication system according to the aforementioned feature, a degree of expanding the coverage of the low-power base station is determined according to an amount (i.e. possibility of interference occurrence) of usable resources which are radio resources usable as a particular downlink channel by the high-power base station. Thereby, the coverage of the low power base stations can be expanded appropriately considering the possibility of interference occurrence. Accordingly, interference between the base stations can be suppressed even if the coverage of the low power base stations is expanded.

Another feature of the radio communication system is summarized as follows. In the radio communication system according to the aforementioned feature, the determination unit determines the degree of expanding the coverage of the low-power base station such that the degree becomes larger as the usable resources decrease.

Another feature of the radio communication system is summarized as follows. In the radio communication system according to the aforementioned feature, the usable resources decrease, the determination unit determines the degree of expanding the coverage of the low-power base station such that the degree is made larger than the degree determined before the usable resources decrease.

Another feature of the radio communication system is summarized as follows. The radio communication system according to the aforementioned feature further comprising: a selector (connection target selector 121, connection target selector 221) configured to select, as a connection target of a radio terminal, the base station providing the highest reception quality value on the basis of a first reception quality value ($RSRP_{MeNB}$) indicating reception quality of a radio signal that the radio terminal receives from the high-power base station, a second reception quality value ($RSRP_{PeNB}$) indicating reception quality of a radio signal that the radio terminal receives from the low-power base station, and a correction value (bias value) for correcting the second reception quality value to a larger value, wherein the correction value indicates the degree of expanding the coverage of the low-power base station, and the determination unit determines the correction value according to the amount of usable resources.

Another feature of the radio communication system is summarized as follows. In the radio communication system according to the aforementioned feature, the particular downlink channel is a data transmission channel for transmitting user data to a radio terminal.

Another feature of the radio communication system is summarized as follows. In the radio communication system according to the aforementioned feature, the usable resources are at least part of a total downlink frequency band (total resource blocks).

Another feature of the radio communication system is summarized as follows. In the radio communication system according to the aforementioned feature, the usable resources are at least part of a time range in a total downlink time frame (subframe or radio frame).

A feature of a high-power base station is summarized as follows. A high-power base station comprises: a determination unit (bias value determination unit 123) configured to determine a degree of expanding coverage of a low-power base station (e.g. pico-cell base station PeNB) according to an amount of usable resources which are radio resources usable as a particular downlink channel (e.g. PDSCH) by the high-power base station, the low-power base station installed in a communication area of the high-power base station and having lower transmission power than the high-power base station; and a transmitter (X2 interface communication unit 140) configured to transmit, to the low-power base station, information indicating the expansion degree determined by the determination unit.

A feature of a low-power base station is summarized as follows. A low-power base station (e.g. pico-cell base station PeNB) installed in a communication area of a high-power base station and having lower transmission power than the high-power base station, comprises: a determination unit (bias value determination unit 223) configured to determine a degree of expanding coverage of the low-power base station according to an amount of usable resources which are radio resources usable as a particular downlink channel by the high-power base station.

A feature of a communication control method is summarized as follows. A communication control method comprises: determining a degree of expanding coverage of a low-power base station according to an amount of usable resources which are radio resources usable as a particular downlink channel by a high-power base station, wherein the low-power base station installed in a communication area of the high-power base station and having lower transmission power than the high-power base station.

Another feature of a communication control method is summarized as follows. A communication control method comprises: causing a high-power base station to transmit, to a low-power base station, information indicating an amount of usable resources which are radio resources usable as a particular downlink channel by the high-power base station, the low-power base station installed in a communication area of the high-power base station and having lower transmission power than the high-power base station; causing the low-power base station to determine a degree of expanding coverage of the low-power base station based on the information indicating the amount of usable resources received from the high-power base station, and to transmit, to the high-power base station, information indicating the determined degree of expanding the coverage of the low-power base station; and causing the high-power base station to receive the information indicating the degree of expanding the coverage of the low-power base station, which is transmitted from the low-power base station.

The present invention can provide a radio communication system, a high-power base station, a low-power base station, and a communication control method capable of suppressing interference between the base stations even when the coverage of the low-power base station is expanded.

DESCRIPTION OF THE EMBODIMENTS

Descriptions are given of a first embodiment, a second embodiment, and other embodiments of the present invention. In the drawings referred to by the following embodiments, the same or similar parts are given the same or similar reference numerals.

[Overview of the LTE System]

Before describing the first embodiment and the second embodiment, an overview of an LTE system is described, on points related to the present invention.

Figure 1:
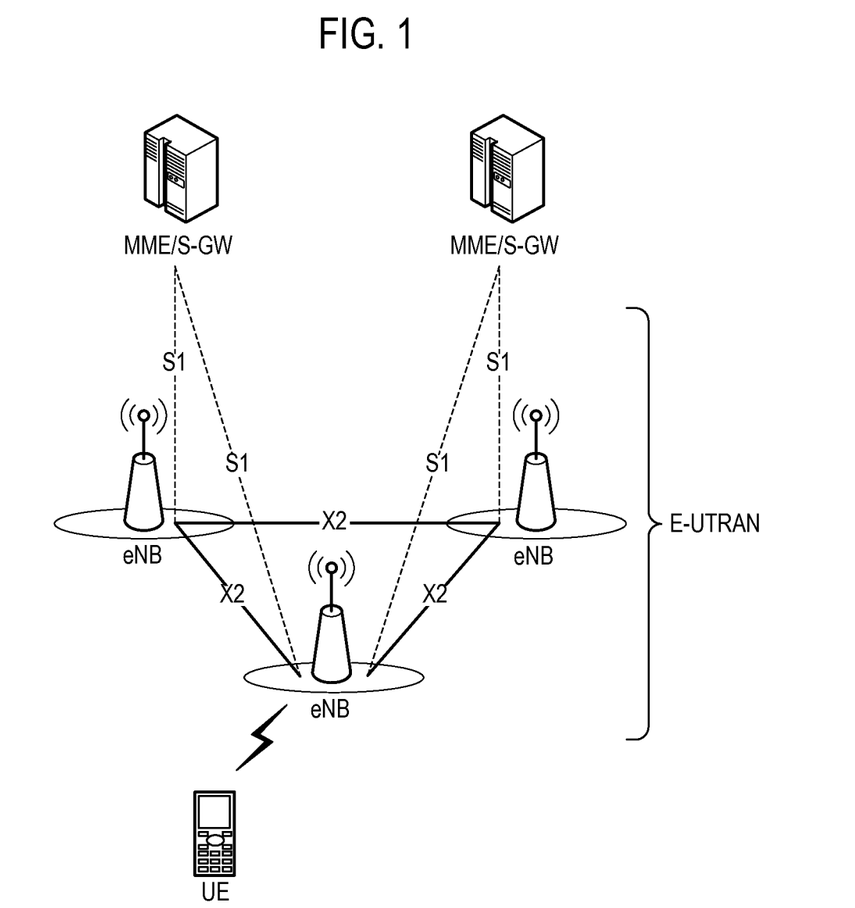
FIG. 1 is a diagram illustrating the overview of an LTE system according to a first embodiment and a second embodiment.

FIG. 1 is a diagram illustrating the overview of the LTE system. As shown in FIG. 1, multiple radio base stations eNB configure E-UTRAN (Evolved-UMTS Terrestrial Radio Access Network). Each of the various radio base stations eNB forms a cell which consists of a communication area where a radio terminal UE is to be provided with services.

The radio terminal UE is a radio communication device that is owned by the user, and is also called a user device. The radio terminal UE is configured to connect to a radio base station eNB from which the radio terminal UE measures the highest reference signal received power (RSRP) among the multiple radio base stations eNB. Note that it is not limited to the RSRP, and other reception quality indices, such as SNR (Signal to Noise ratio), may be used instead.

The radio base stations eNB are capable of communicating with each other via X2 interfaces which are logical communication paths providing communications between the base stations. Each of the multiple radio base stations eNB can communicate with EPC (Evolved Packet Core), or more specifically, MME (Mobility Management Entity)/S-GW (Serving Gateway), via an S1 interface.

In radio communication between each radio base station eNB and the radio terminal UE, an OFDMA (Orthogonal Frequency Division Multiple Access) scheme is employed as the multiplexing scheme for the downlink, and an SC-FDMA (Single-Carrier Frequency Division Multiple Access) scheme is employed as the multiplexing scheme for the uplink. Further, an FDD (Frequency Division Duplex) scheme or a TDD (Time Division Duplex) scheme is employed as the duplexing scheme.

FIG. 2(a) is a frame configuration diagram showing the configuration of a downlink radio frame used when the FDD scheme is employed. FIG. 2(b) is a frame configuration diagram showing the configuration of a downlink subframe.

As shown in FIG. 2(a), the downlink radio frame is configured with ten downlink subframes, and each downlink subframe is configured with two downlink slots. Each downlink subframe is 1 ms long, and each downlink slot is 0.5 ms long. Each downlink slot contains seven OFDM symbols in the time-axis direction (time domain), and contains multiple resource blocks (RB) in the frequency-axis direction (frequency domain) as shown in FIG. 2(b). Each RB contains 12 sub-carriers.

Figure 2:
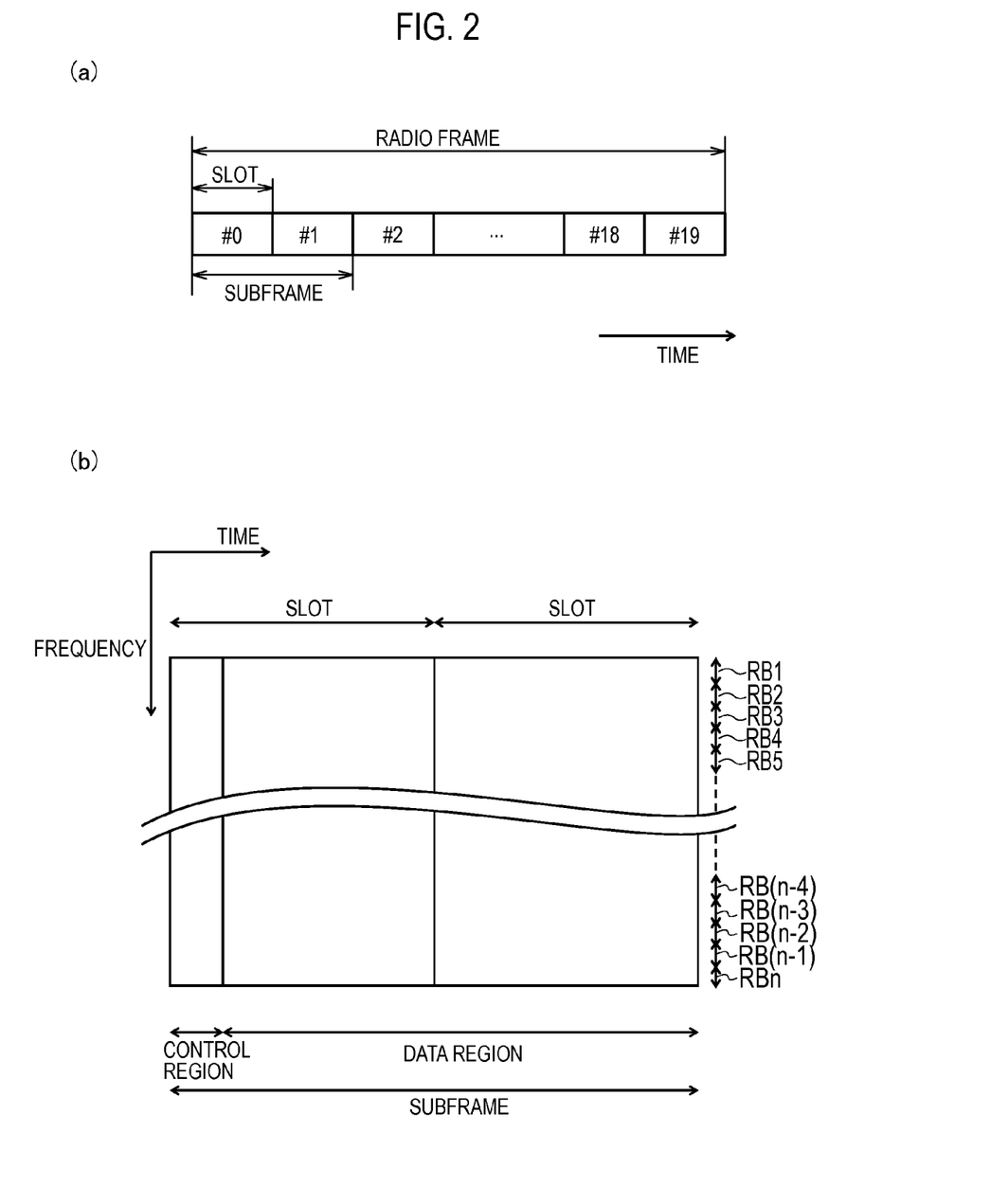
FIG. 2 is a frame configuration diagram showing a frame configuration used when a FDD scheme is employed.

As shown in FIG. 2 (b), each downlink subframe contains two successive downlink slots. A maximum of three OFDM symbols from the top of the first downlink slot of each downlink subframe is a control region configuring radio resources used as PDCCH (Physical Downlink Control Channel) for transmitting control information. The control information corresponds to information such as uplink and downlink scheduling information (i.e., information on allocated radio resources).

The rest of the OFDM symbols composing the downlink subframe is a data region configuring radio resources used as PDSCH (Physical Downlink Shared Channel) for transmitting user data. The radio terminal UE can identify user data transmitted via PDSCH by decoding the control information transmitted via PDCCH.

First Embodiment

The first embodiment of the present invention is described next. The first embodiment is described using, as an example, a heterogeneous network deployment in which pico-cell base stations PeNB which are low-power base stations (low-output base stations) are installed inside a communication area (i.e., a macro cell) of a macro-cell base station MeNB which is a high-power base station (a high-output base station).

In the following first embodiment, descriptions are given of (1) the configuration of a radio communication system, (2) interference control, (3) the configuration of a macro-cell base station, (4) the configuration of a pico-cell base station, (5) operations of the radio communication system, and (6) advantageous effects of the first embodiment.

(1) Configuration of the Radio Communication System

Figure 3:
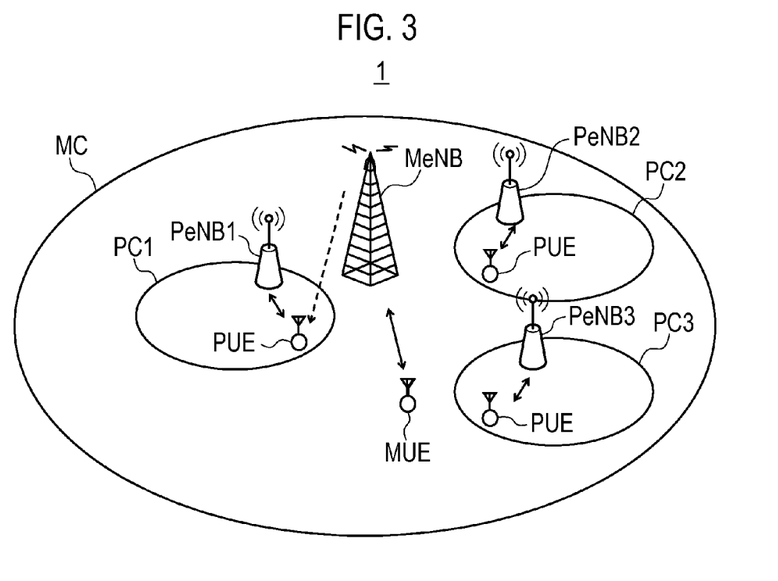
FIG. 3 is a schematic configuration diagram of a radio communication system according to the first embodiment.

FIG. 3 is a diagram of the schematic configuration of a radio communication system 1 according to the first embodiment.

As shown in FIG. 3, the radio communication system 1 includes a macro-cell base station MeNB, a radio terminal MUE connected to the macro-cell base station MeNB, pico-cell base stations PeNB1 to PeNB3 which are installed within a macro cell MC formed by the macro-cell base station MeNB and are adjacent to the macro-cell base station MeNB, and radio terminals PUE in pico cells PC formed by the pico-cell base stations PeNB1 to PeNB3 and are connected to the pico-cell base stations PeNB, respectively. Below, the pico-cell base stations PeNB1 to PeNB3 are simply called pico-cell base stations PeNB when no particular differentiation is necessary among them. The macro-cell base station MeNB and the pico-cell base stations PeNB use a common frequency band. In addition, the pico cells PC formed by the pico-cell base stations PeNB are called "hot zones" below.

The pico-cell base stations PeNB (also called hot-zone nodes) are low-power base stations with lower transmission power than the macro-cell base station MeNB, and are installed in high-traffic zones of the macro cell. In the heterogeneous network, the pico-cell base stations PeNB have low transmission power. Accordingly, when a maximum received power standard (called an RP standard below), which is a connection target selection standard where the radio terminal UE selects and connects to the radio base station eNB having the highest RSRP, is employed, the coverage of the pico-cell base stations PeNB might decrease. Especially when the pico-cell base stations PeNB are located close to the macro-cell base station MeNB, the coverage of the pico-cell base stations PeNB is so decreased that the pico-cell base stations PeNB cannot be used effectively.

The following two methods can be mainly used to allow the coverage of each pico-cell base station PeNB to expand without increasing the transmission power of the pico-cell base station PeNB.

In the first method, instead of using the RP standard where the radio base station eNB transmitting radio signals of the highest RSRP is selected as a connection target of the radio terminal UE, the radio base station eNB having the smallest propagation loss (path loss) with the radio terminal UE is selected as a connection target of the radio terminal UE. In this way, the radio base station eNB closest to the radio terminal UE is for example selected as the connection target, allowing expansion of the coverage of the pico-cell base stations PeNB. Such a connection target selection standard is referred to as a minimum path-loss standard (called a PL standard below).

In the second method, when the radio terminal UE can receive radio signals from each of the macro-cell base station MeNB and the pico-cell base stations PeNB, before comparing the RSRP of the macro-cell base station MeNB and the RSRPs of the pico-cell base stations PeNB, a bias value is added to each of the RSRPs of the pico-cell base stations PeNB. By giving bias to the RSRPs of the pico-cell base stations PeNB (i.e., adding a bias value to the RSRPs of the pico-cell base stations PeNB), the RSRPs given the bias are more likely to exceed the RSRP of the macro-cell base station MeNB. Consequently, the pico-cell base stations PeNB are preferentially selected as the connection target, achieving expansion of the coverage of the pico-cell base stations PeNB. Such a connection target selection standard is referred to as a range expansion standard (called an RE standard below). By making the bias value equal to the difference in transmission power between the macro-cell base station MeNB and the pico-cell base station PeNB (e.g., 16 dB), the RE standard becomes a connection target selection standard equivalent to the PL standard.

In the first embodiment, the coverage of the pico-cell base station PeNB is expanded using the RE standard. For example, the connection target of the radio terminal UE is selected by the radio terminal UE when the radio terminal UE is in standby (an idle state), and selected by the radio base station eNB when the radio terminal UE is in communication (an active state). In the active state, the radio terminal UE periodically gives RSRP measurement values to the radio base station eNB to which the radio terminal UE is connected. Accordingly, the radio base station eNB to which the radio terminal UE is connected can select the next connection target of the radio terminal UE and hand-over the radio terminal UE to the next connection target.

The macro-cell base station MeNB uses a PDSCH to transmit user data to the radio terminal MUE. The pico-cell base station PeNB uses a PDSCH to transmit user data to the radio terminal PUE. When the frequency bands of these PDSCHs overlap each other, the PDSCHs of the macro-cell base station MeNB and the pico-cell base station PeNB interfere with each other.

When the coverage of the pico-cell base station PeNB is expanded, the radio terminal PUE connected to the pico-cell base station PeNB sometimes receives higher power from the macro-cell base station MeNB than from the pico-cell base station PeNB. In this case, the PDSCH of the pico-cell base station PeNB receives strong interference from the PDSCH of the macro-cell base station MeNB, making the radio terminal PUE unable to receive (decode) user data.

(2) Interference Control

In the downlink of the heterogeneous network, if the coverage is expanded by giving bias according to the RE standard so that the coverage may be larger than the hot zone formed by the RP standard, the difference in transmission power between the macro-cell base station MeNB and the pico-cell base station PeNB causes interference power to be greater than desired signal power.

Then, the radio terminal UE not having an optimal SINR is consequently contained in the hot zone. Such a radio terminal UE basically suffers strong interference from the macro-cell base station MeNB having high transmission power, so that the SINR becomes very low.

Figure 4:
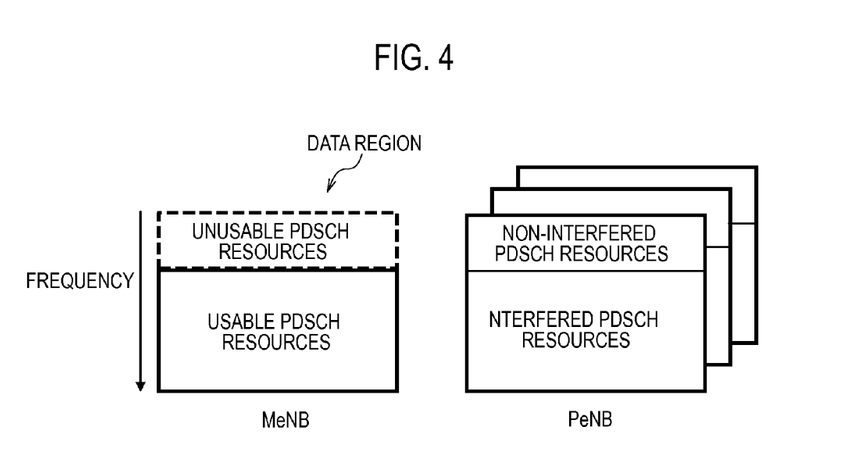
FIG. 4 is a diagram illustrating interference control according to the first embodiment and the second embodiment.

To avoid this, the following interference control is performed in the first embodiment. FIG. 4 is a diagram illustrating interference control according to the first embodiment.

As shown in FIG. 4(a), only part of the PDSCH resources (corresponding to the data region shown in FIG. 2(b)) of the macro-cell base station MeNB is usable, and the rest is not used. Thereby, the unused part is offered to the radio terminal PUE having a low SINR in the hot zone. Herein, the PDSCH resources usable by the macro-cell base station MeNB are also called "usable PDSCH resources," and the PDSCH resources not usable by the macro-cell base station MeNB are also called "unusable PDSCH resources." In the first embodiment, the usable PDSCH resources are at least part of the total downlink resource blocks, and the unusable PDSCH resources are the rest of the total downlink resource blocks, i.e., resource blocks other than the part described above. The PDSCH resources can be divided in any manner, but due to the LTE specifications, they are divided according to the resolution of a fed-back CQI.

As shown in FIG. 4(b), the radio resources which correspond to the unusable PDSCH resources do not receive interference from the macro-cell base station MeNB. Accordingly, the pico-cell base station PeNB allocates such interference-free PDSCH resources to the radio terminal PUE of a low SINR. To be more specific, the radio terminal PUE periodically feeds back a measurement result of reception quality as a channel quality indicator (CQI) to the pico-cell base station PeNB, and the pico-cell base station PeNB can allocate the interference-free PDSCH resources preferentially to the radio terminal PUE in response to feedback of a favorable CQI for the interference-free PDSCH resources.

Alternatively, the pico-cell base station PeNB can be given the interference-free PDSCH resources by being notified of the unusable PDSCH resources by the macro-cell base station MeNB. In this case, the pico-cell base station PeNB can allocate the interference-free PDSCH resources preferentially to the radio terminal PUE without waiting for feedback of a favorable CQI for the interference-free PDSCH resources. In the first embodiment, the macro-cell base station MeNB notifies the pico-cell base station PeNB of the unusable PDSCH resources.

The amount of usable PDSCH resources of the macro-cell base station MeNB (herein, an "amount" includes the concept of "percentage") is determined according to, for example, a message from the pico-cell base station PeNB or another macro-cell base station. In the LTE system, a message for restricting usage of the PDSCH resources can be exchanged between the base stations via the X2 interfaces, and therefore the macro-cell base station MeNB determines the amount of usable PDSCH resources according to the received message.

Alternatively, the amount of usable PDSCH resources of the macro-cell base station MeNB is determined according to the traffic load of the macro-cell base station MeNB (e.g., the number of terminals being connected). More specifically, the amount of usable PDSCH resources of the macro-cell base station MeNB is decreased when the macro-cell base station MeNB has low traffic load, whereas the amount of usable PDSCH resources of the macro-cell base station MeNB is increased when the macro-cell base station MeNB has high traffic load.

In the first embodiment, the macro-cell base station MeNB determines the bias value of the RE standard according to the amount of its usable PDSCH resources. Specifically, when the amount of usable PDSCH resources of the macro-cell base station MeNB is small, even a large bias value of the RE standard would not cause the radio terminal PUE connected to the pico-cell base station PeNB to easily receive interference from the macro-cell base station MeNB. On the other hand, when the amount of usable PDSCH resources of the macro-cell base station MeNB is large, a large bias value of RE standard would cause the radio terminal PUE connected to the pico-cell base station PeNB to easily receive interference from the macro-cell base station MeNB. Accordingly, when the usable PDSCH resources of the macro-cell base station MeNB decrease, the macro-cell base station MeNB correspondingly increases the bias value of the RE standard, and when the usable PDSCH resources of the macro-cell base station MeNB increase, the macro-cell base station MeNB correspondingly decreases the bias value of the RE standard. In this way, even when the coverage of the pico-cell base station PeNB is expanded, interference between the PDSCHs of the base stations can be suppressed. Further, when the usable PDSCH resources of the macro-cell base station MeNB are updated as appropriate, it is desirable that the bias value of the RE standard be newly set according to the update of the usable PDSCH resources of the macro-cell base station MeNB.

(3) Configuration of the Macro-Cell Base Station

Figure 5:
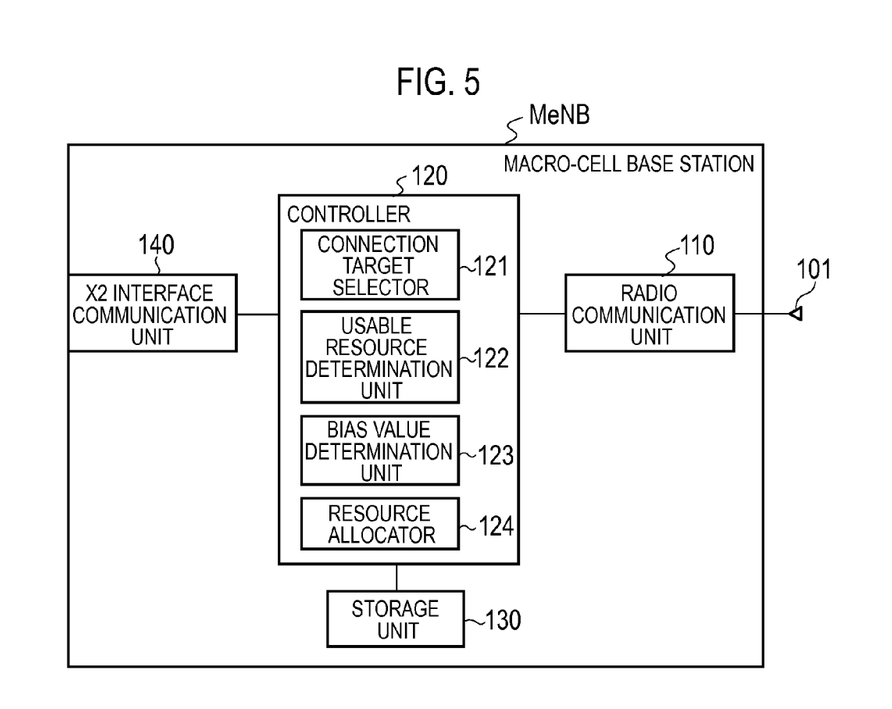
FIG. 5 is a block diagram showing the configuration of a macro-cell base station according to the first embodiment.

The configuration of the macro-cell base station MeNB is described next. FIG. 5 is a block diagram showing the configuration of the macro-cell base station MeNB according to the first embodiment.

As shown in FIG. 5, the macro-cell base station MeNB includes an antenna unit 101, a radio communication unit 110, a controller 120, a storage unit 130, and an X2 interface communication unit 140.

The radio communication unit 110 is configured with, for example, a radio frequency (RF) circuit, a base band (BB) circuit, or the like, and configured to exchange radio signals with the radio terminal PUE via the antenna unit 101. The radio communication unit 110 is also configured to modulate transmission signals and demodulate received signals.

The controller 120 is configured with, for example, a CPU, and is configured to control various functions of the macro-cell base station MeNB. The storage unit 130 is configured with a memory for example, and is configured to store various pieces of information used for the control of the macro-cell base station MeNB, or the like. The X2 interface communication unit 140 is configured to use an X2 interface to perform communications with other radio base stations.

The controller 120 includes a connection target selector 121, a usable resource determination unit 122, a bias value determination unit 123, and a resource allocator 124.

The connection target selector 121 is configured to select the radio base station to which the radio terminal MUE is to be connected next, based on RSRP information (i.e., a measurement report) informed of by the radio terminal MUE. When the radio terminal MUE receives reference signals from the macro-cell base station MeNB and the pico-cell base station PeNB, before comparing $RSRP_{MeNB}$ of the macro-cell base station MeNB and $RSRP_{PeNB}$ of the pico-cell base station PeNB, the connection target selector 121 gives bias to RSRPPeNB. When RSRPPeNB thus given bias is higher than RSRPMeNB, the connection target selector 121 performs hand-over control, switching the connection target of the radio terminal MUE to the pico-cell base station PeNB.

The usable resource determination unit 122 is configured to determine usable PDSCH resources according to messages from other radio base stations, which messages are for limiting use of PDSCH resources and received by the X2 interface communication unit 140. Alternatively, the usable resource determination unit 122 is configured to determine the usable PDSCH resources according to the traffic load of the macro-cell base station MeNB (e.g., the number of terminals being connected).

The bias value determination unit 123 is configured to determine a bias value of the RE standard for each of the pico-cell base stations PeNB according to the amount of usable PDSCH resources determined by the usable resource determination unit 122. To be more specific, when the usable PDSCH resources of the macro-cell base station MeNB decrease, the bias value determination unit 123 correspondingly increases the bias value of the RE standard, and when usable PDSCH resources of the macro-cell base station MeNB increase, the bias value determination unit 123 correspondingly decreases the bias value of the RE standard.

The bias value of the RE standard determined by the bias value determination unit 123 may be the same for all the pico-cell base stations PeNB, or may be different for each of the pico-cell base stations PeNB. For example, a relatively-large bias value of the RE standard is set for the pico-cell base station PeNB which is located close to the macro-cell base station MeNB (or has small path loss) and therefore is likely to be affected by the interference. Conversely, a relatively-small bias value of the RE standard is set for the pico-cell base station PeNB which is away from the macro-cell base station MeNB (or has large path loss) and therefore is unlikely to be affected by the interference.

The resource allocator 124 is configured to allocate radio resources (resource blocks) to the radio terminal MUE from the usable PDSCH resources determined by the usable resource determination unit 122. For example, the resource allocator 124 allocates radio resources (resource blocks) to the radio terminal MUE from the usable PDSCH resources based on the CQIs fed back from the radio terminal MUE and by using a scheduling algorithm such as proportional fairness (PF).

(4) Configuration of the Pico-Cell Base Station

Figure 6:
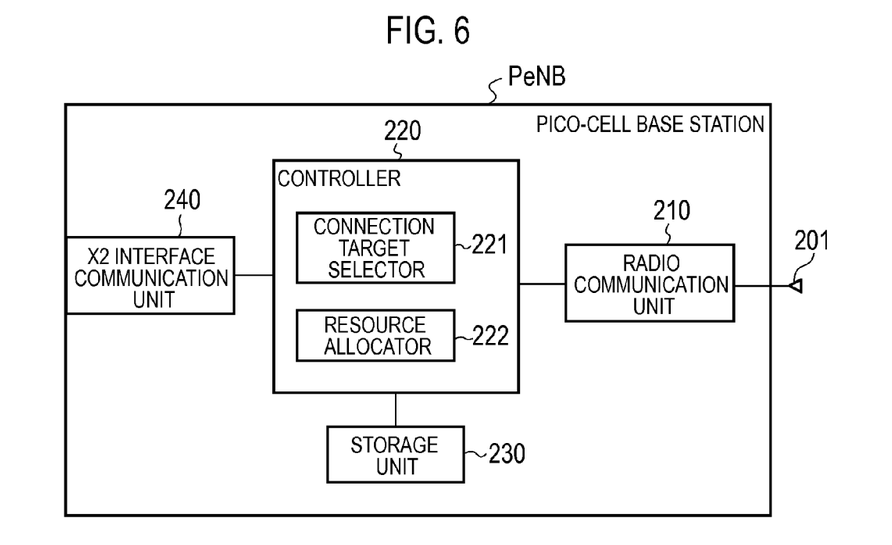
FIG. 6 is a block diagram showing the configuration of a pico-cell base station according to the first embodiment.

The configuration of the pico-cell base station PeNB is described next. FIG. 6 is a block diagram showing the configuration of the pico-cell base station PeNB according to the first embodiment.

As shown in FIG. 6, the pico-cell base station PeNB includes an antenna unit 201, a radio communication unit 210, a controller 220, a storage unit 230, and an X2 interface communication unit 240.

The radio communication unit 110 is configured with, for example, a radio frequency (RF) circuit, a base band (BB) circuit, or the like, and configured to exchange radio signals with the radio terminal PUE via the antenna unit 201. The radio communication unit 210 is also configured to modulate transmission signals and demodulate received signals.

The controller 220 is configured with, for example, a CPU, and is configured to control various functions of the pico-cell base station PeNB. The storage unit 230 is configured with a memory for example, and is configured to store various pieces of information used for the control of the pico-cell base station PeNB, or the like. The X2 interface communication unit 240 is configured to use the X2 interface to perform communications with other radio base stations.

The controller 220 includes a connection target selector 221 and a resource allocator 222.

The connection target selector 221 is configured to select the radio base station to which the radio terminal PUE is to be connected next, based on the RSRPs informed of by the radio terminal PUE connected to the pico-cell base station PeNB. When the radio terminal PUE receives reference signals from the macro-cell base station MeNB and the pico-cell base stations PeNB, before comparing the RSRPMeNB of the macro-cell base station MeNB and the RSRPPeNB of each of the pico-cell base stations PeNB, the connection target selector 221 gives bias to the RSRPPeNB. When the RSRPPeNB thus given bias is lower than the RSRPMeNB, the connection target selector 221 performs hand-over control, switching the connection target of the radio terminal PUE to the macro-cell base station MeNB.

The resource allocator 222 is configured to allocate radio resources (resource blocks) to the radio terminal PUE. For example, the resource allocator 222 allocates radio resources (resource blocks) to the radio terminal MUE from the usable PDSCH resources, based on the CQIs fed back from the radio terminal PUE and by using a scheduling algorithm such as proportional fairness (PF). In a case where the unusable PDSCH resources are notified of by the macro-cell base station MeNB, the resource allocator 222 allocates interference-free PDSCH resources which correspond to the unusable PDSCH resources (see FIG. 4) preferentially to the radio terminal PUE without waiting for feedback of a favorable CQI for the interference-free PDSCH resources.

(5) Operations of the Radio Communication System

Figure 7:
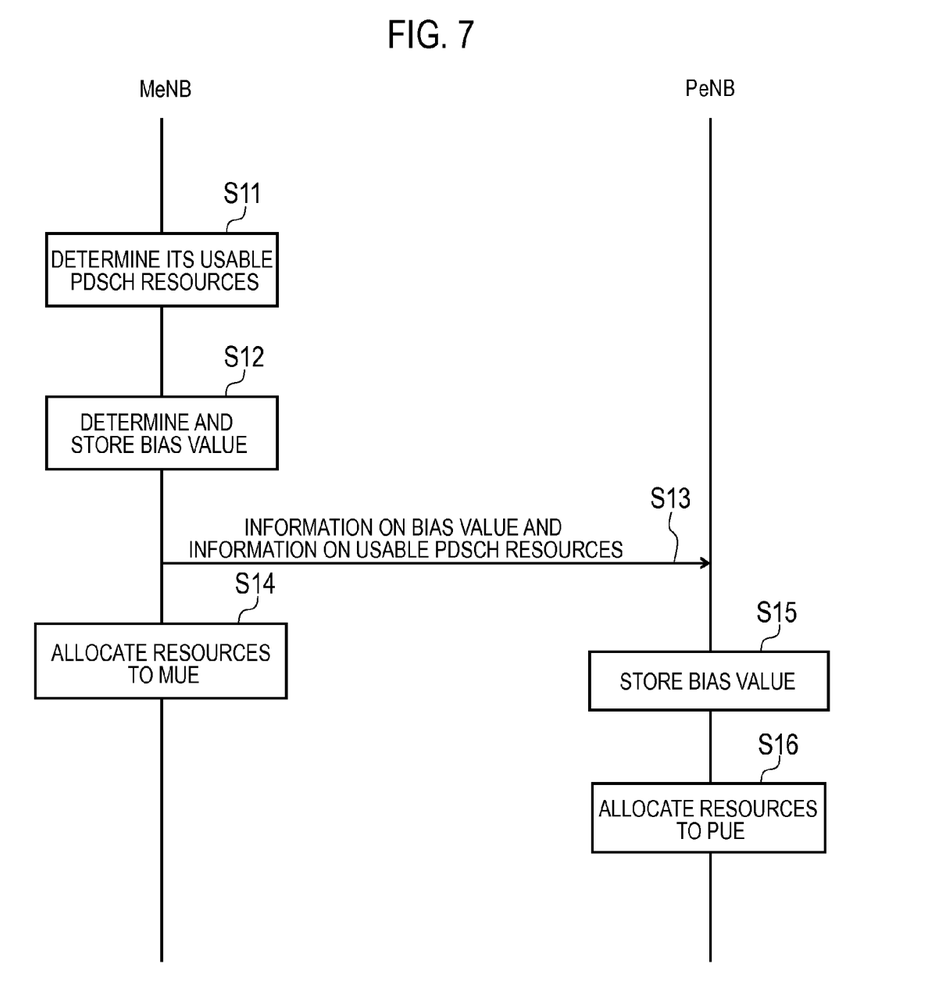
FIG. 7 is an operation sequence diagram showing the operations of the radio communication system according to the first embodiment.

FIG. 7 is an operation sequence diagram showing the operations of the radio communication system 1 according to the first embodiment.

In Step S11, the usable resource determination unit 122 of the macro-cell base station MeNB determines its usable PDSCH resources.

In Step S12, the bias value determination unit 123 of the macro-cell base station MeNB determines a bias value of the RE standard for each of the pico-cell base stations PeNB according to the amount of usable PDSCH resources determined by the usable resource determination unit 122, and stores the bias values in the storage unit 130. The bias values stored in the storage unit 130 are thereafter referred to by the connection target selector 121.

In Step S13, the X2 interface communication unit 140 of the macro-cell base station MeNB sends the pico-cell base stations PeNB information indicating the bias values determined by the bias value determination unit 123 and information indicating the unusable PDSCH resources determined by the usable resource determination unit 122. The X2 interface communication unit 240 of each pico-cell base station PeNB receives the information indicating the bias values and the information indicating the unusable PDSCH resources.

In Step S14, the resource allocator 124 of the macro-cell base station MeNB allocates radio resources (resource blocks) to the radio terminal MUE from the usable PDSCH resources determined by the usable resource determination unit 122.

In Step S15, the storage unit of 230 of each pico-cell base station PeNB stores the information indicating the bias values received by the X2 interface communication unit 240. The bias values are thereafter referred to by the connection target selector 221.

In Step S16, the resource allocator 222 of each pico-cell base station PeNB allocates radio resources (resource blocks) to the radio terminal PUE. Based on the information indicating the unusable PDSCH resources received by the X2 interface communication unit 240, the resource allocator 222 allocates interference-free PDSCH resources corresponding to the unusable PDSCH resources (see FIG. 4) preferentially to the radio terminal PUE of a low SINR.

(6) Advantageous Effects of First Embodiment

As described above, according to the amount of its usable PDSCH resources, the macro-cell base station MeNB determines the bias values indicating the degree of expanding the coverage of the pico-cell base stations PeNB. Thereby, the coverage of the pico-cell base stations PeNB can be expanded appropriately considering the high possibility of interference occurrence. Accordingly, interference between the base stations can be suppressed even if the coverage of the pico-cell base stations PeNB is expanded.

Second Embodiment

In the first embodiment, the macro-cell base station MeNB determines the bias values, but in the second embodiment, each pico-cell base station PeNB determines its bias value. In the following, points different from the first embodiment are described, while overlapping points are not described again.

Figure 8:
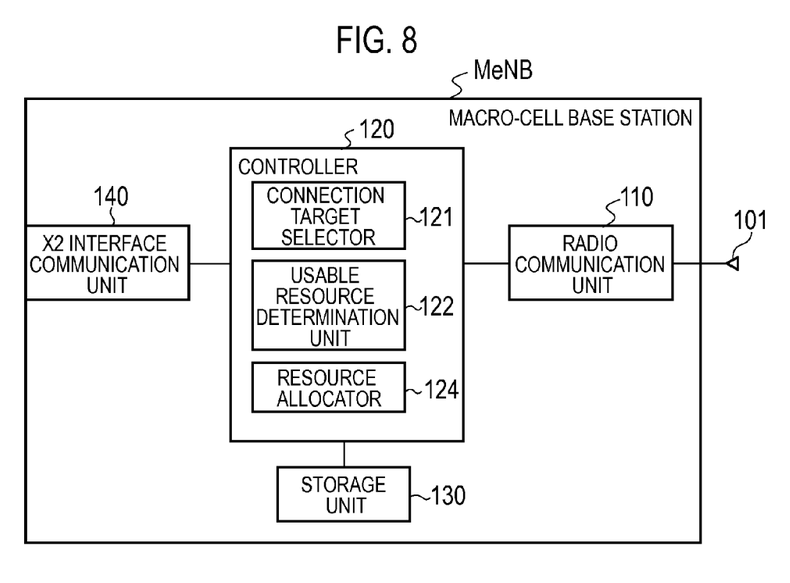
FIG. 8 is a block diagram showing the configuration of a macro-cell base station according to the second embodiment.

FIG. 8 is a block diagram showing the configuration of a macro-cell base station MeNB according to the second embodiment. As shown in FIG. 8, the macro-cell base station MeNB according to the second embodiment does not have the bias value determination unit 123 described in the first embodiment.

Figure 9:
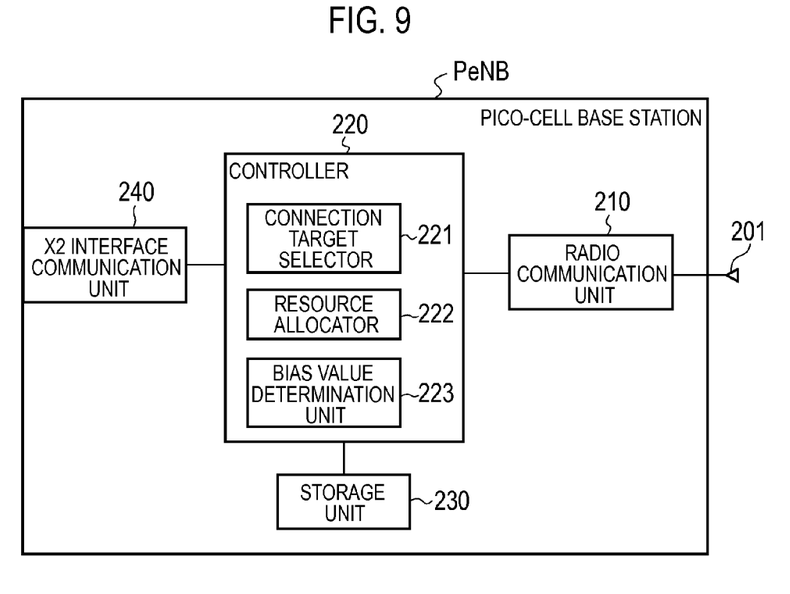
FIG. 9 is a block diagram showing the configuration of a pico-cell base station according to the second embodiment.

FIG. 9 is a block diagram showing the configuration of each pico-cell base station PeNB according to the second embodiment. As shown in FIG. 9, the pico-cell base station PeNB according to the second embodiment includes a bias value determination unit 223. The bias value determination unit 223 is configured to determine a bias value of the RE standard. The method of determining the bias value is the same as in the first embodiment.

Figure 10:
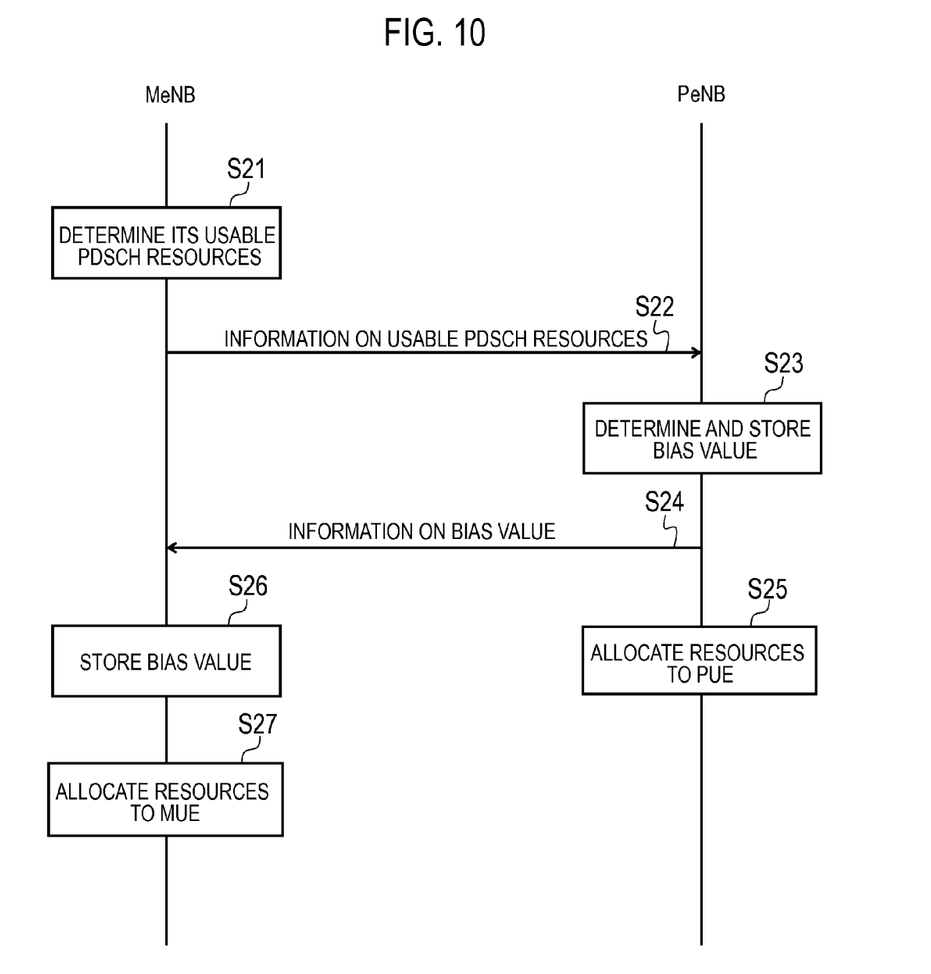
FIG. 10 is an operation sequence diagram showing the operations of a radio communication system according to the second embodiment.

FIG. 10 is an operation sequence diagram showing the operations of a radio communication system 1 according to the second embodiment. FIG. 10 shows an example of an operation sequence performed between one pico-cell base station PeNB and the macro-cell base station MeNB.

In Step S21, the usable resource determination unit 122 of the macro-cell base station MeNB determines the usable PDSCH resources of the macro-cell base station MeNB.

In Step S22, the X2 interface communication unit 140 of the macro-cell base station MeNB sends the pico-cell base station PeNB information indicating the usable PDSCH resources (or its amount) determined by the usable resource determination unit 122. The X2 interface communication unit 240 of the pico-cell base station PeNB receives the information indicating the usable PDSCH resources (or its amount) of the macro-cell base station MeNB.

In Step S23, based on the information received by the X2 interface communication unit 240, the bias value determination unit 223 of the pico-cell base station PeNB determines a bias value of the RE standard for the pico-cell base station PeNB according to the amount of usable PDSCH resources of the macro-cell base station MeNB. The bias value determination unit 223 then stores the bias value in the storage unit 230. The bias value stored in the storage unit 230 is thereafter referred to by the connection target selector 221.

In Step S24, the X2 interface communication unit 240 of the pico-cell base station PeNB sends the macro-cell base station MeNB information indicating the bias value determined by the bias value determination unit 223. The X2 interface communication unit 140 of the macro-cell base station MeNB receives the information indicating the bias value.

In Step S25, the resource allocator 222 of the pico-cell base station PeNB allocates radio resources (resource blocks) to the radio terminal PUE. The resource allocator 222 allocates interference-free PDSCH resources corresponding to the unusable PDSCH resources of the macro-cell base station MeNB (see FIG. 4) preferentially to the radio terminal PUE with a low SINR.

In Step S26, the storage unit 130 of the macro-cell base station MeNB stores the information indicating the bias value received by the X2 interface communication unit 140. The bias value thus stored is thereafter referred to by the connection selector 121.

In Step S27, based on the information indicating unusable PDSCH resources received by the X2 interface communication unit 140, the resource allocator 124 of the macro-cell base station MeNB allocates radio resources (resource blocks) to the radio terminal MUE from the usable PDSCH resources.

As described, the second embodiment can offer advantageous effects similar to those in the first embodiment.

Other Embodiments

As described above, the present invention has been disclosed by using the embodiments. However, it should not be understood that the description and drawings which constitute part of this disclosure limit the present invention. From this disclosure, various alternative embodiments, examples, and operation techniques will be easily found by those skilled in the art.

Figure 11:
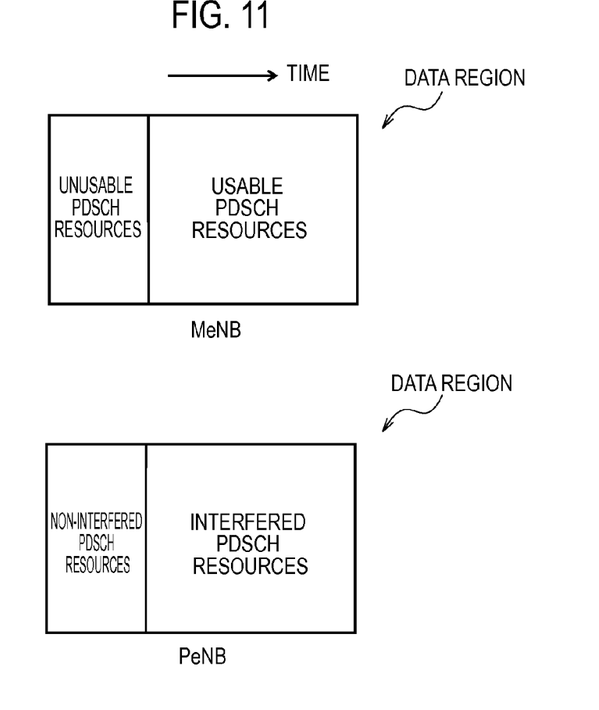
FIG. 11 is a diagram illustrating a case where PDSCH resources are divided by time.
Figure 12:
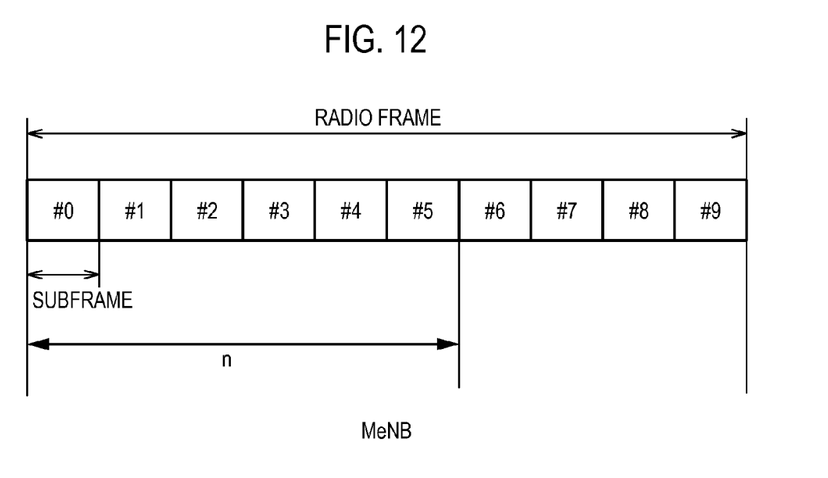
FIG. 12 is a diagram illustrating another case of dividing PDSCH resources by time.

In the embodiments described above, the PDSCH resources are divided by frequency, but the PDSCH resources may be divided by time. FIG. 11 is a diagram showing a case of dividing the PDSCH resources by time. Any unit can be set for the time division, but due to the LTE specifications, the resources are divided in a unit of OFDM symbol. Instead of time-dividing a subframe in a unit of OFDM symbol, a radio frame shown in FIG. 2 may be divided by time in a unit of subframe. FIG. 12 shows a case of dividing a radio frame by time in a unit of subframe.

In the embodiments described above, the resource division involves division of PDSCH resources (i.e., division of a data region). However, the present invention is not limited to PDSCH, and also applicable to division of PDCCH resources (i.e., division of a control region). Either of the frequency division or the time division may be used for the division of PDCCH resources.

In LTE Advanced, a relay node which is a radio base station configuring a wireless backhaul is expected to be employed, and the X2 interface is to be employed for the relay node as well. Accordingly, the relay node can be the low-power base station according to the present invention.

Further, the present invention is applied to the LTE system in the embodiments described above, but may be applied to other radio communication systems such as a radio communication system based on WiMAX (IEEE 802.16).

As described above, the present invention naturally includes various embodiments which are not described herein. Accordingly, the technical scope of the present invention should be determined only by the matters to define the invention in the scope of claims regarded as appropriate based on the description.

This application claims the benefit of priority from Japanese Patent Application No. 2010-95546 (filed on Apr. 16, 2010), the entire contents of which are incorporated herein by reference.

INDUSTRIAL APPLICABILITY

As described, the radio communication system, the high-power base station, the low-power base station, and the communication control method according to the present invention are capable of suppressing interference between the base stations even when the coverage of the low-power base station is expanded, and therefore are useful in radio communication such as mobile communication.

The invention claimed is:

1. A radio communication system comprising:
a high-power base station; and
a low-power base station installed in a communication area of the high-power base station, having lower transmission power than the high-power base station, and the low-power base station expanded in coverage, wherein
the radio communication system further comprising a determination unit configured to determine a bias value of a range expansion standard of the low-power base station, according to an amount of usable resources which are radio resources usable as a particular downlink channel by the high-power base station.

2. The radio communication system according to claim 1, wherein
the determination unit determines the bias value of the range expansion standard of the low-power base station such that the bias value becomes larger as the usable resources decrease.

3. The radio communication system according to claim 1, wherein
when the usable resources decrease, the determination unit determines the bias value of the range expansion standard of the low-power base station such that the bias value is made larger than the bias value determined before the usable resources decrease.

4. The radio communication system according to claim 1, further comprising:
a selector configured to select, as a connection target of a radio terminal, the base station providing the highest reception quality value on the basis of a first reception quality value indicating reception quality of a radio signal that the radio terminal receives from the high-power base station, a second reception quality value indicating reception quality of a radio signal that the radio terminal receives from the low-power base station, and a correction value for correcting the second reception quality value to a larger value, wherein
the correction value indicates the bias value of the range expansion standard of the low-power base station, and
the determination unit determines the correction value according to the amount of usable resources.

5. The radio communication system according to claim 1, wherein the particular downlink channel is a data transmission channel for transmitting user data to a radio terminal.

6. The radio communication system according to claim 1, wherein
the usable resources are at least part of a total downlink frequency band.

7. The radio communication system according to claim 1, wherein
the usable resources are at least part of a time range in a total downlink time frame.

8. A high-power base station comprising:
a determination unit configured to determine a bias value of a range expansion standard of a low-power base station according to an amount of usable resources which are radio resources usable as a particular downlink channel by the high-power base station, the low-power base station installed in a communication area of the high-power base station and having lower transmission power than the high-power base station; and
a transmitter configured to transmit, to the low-power base station, information indicating the bias value determined by the determination unit.

9. A low-power base station installed in a communication area of a high-power base station and having lower transmission power than the high-power base station, comprising:
a determination unit configured to determine a bias value of a range expansion standard of the low-power base station according to an amount of usable resources which are radio resources usable as a particular downlink channel by the high-power base station.

10. A communication control method comprising:
determining a bias value of range expansion standard of a low-power base station according to an amount of usable resources which are radio resources usable as a particular downlink channel by a high-power base station, wherein the low-power base station installed in a communication area of the high-power base station and having lower transmission power than the high-power base station.

11. A communication control method comprising:

causing a high-power base station to transmit, to a low-power base station, information indicating an amount of usable resources which are radio resources usable as a particular downlink channel by the high-power base station, the low-power base station installed in a communication area of the high-power base station and having lower transmission power than the high-power base station;

causing the low-power base station to determine a bias value of a range expansion standard of the low-power base station based on the information indicating the amount of usable resources received from the high-power base station, and to transmit, to the high-power base station, information indicating the determined bias value of the range expansion standard of the low-power base station; and causing the high-power base station to receive the information indicating the bias value of a range expansion standard of the low-power base station, which is transmitted from the low-power base station.

* * * * *